(12) United States Patent
Furukawa et al.

(10) Patent No.: US 10,897,178 B2
(45) Date of Patent: Jan. 19, 2021

(54) MOTOR

(71) Applicant: Nidec Corporation, Kyoto (JP)

(72) Inventors: Keizo Furukawa, Kyoto (JP);
Tadayuki Kanatani, Kyoto (JP);
Naoyuki Kanamori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 157 days.

(21) Appl. No.: 16/273,190

(22) Filed: Feb. 12, 2019

(65) Prior Publication Data

US 2019/0267865 A1    Aug. 29, 2019

(30) Foreign Application Priority Data

Feb. 28, 2018  (JP) ................. 2018-035535

(51) Int. Cl.
| | |
|---|---|
| *H02K 3/34* | (2006.01) |
| *H02K 5/173* | (2006.01) |
| *H02K 7/08* | (2006.01) |
| *H02K 3/12* | (2006.01) |
| *H02K 1/28* | (2006.01) |
| *H02K 1/16* | (2006.01) |

(52) U.S. Cl.
CPC ........... *H02K 5/1735* (2013.01); *H02K 1/165* (2013.01); *H02K 1/28* (2013.01); *H02K 3/12* (2013.01); *H02K 3/345* (2013.01); *H02K 7/085* (2013.01)

(58) Field of Classification Search
CPC ........ H02K 5/1735; H02K 7/085; H02K 3/12; H02K 1/28; H02K 3/345; H02K 1/165; H02K 5/1732; H02K 1/146; H02K 21/16; H02K 5/161; H02K 1/18; H02K 1/2786

USPC .............. 310/194, 214, 215, 67 R
See application file for complete search history.

(56) References Cited

U.S. PATENT DOCUMENTS

| 6,639,336 B2 | 10/2003 | Obara |
| 8,076,816 B2 * | 12/2011 | Tsai ............... H02K 3/522 |
| | | 310/194 |

FOREIGN PATENT DOCUMENTS

| JP | 2530781 Y2 | 3/1997 |
| JP | 4121142 B2 | 7/2008 |
| JP | 2010-57300 A | 3/2010 |
| JP | 5294017 B2 | 9/2013 |

* cited by examiner

*Primary Examiner* — Thomas Truong
(74) *Attorney, Agent, or Firm* — Keating & Bennett

(57) ABSTRACT

A motor includes a stator that includes an annular core back, teeth extending radially outside from the core back and being arranged in a circumferential direction, an insulator covering at least a portion of the teeth, and a coil defined by a conductive wire wound around each of the teeth via the insulator. A radially inside surface of the core back includes core back protrusions extending radially inside and provided with a space therebetween in the circumferential direction. The insulator includes an annular upper lid portion extending radially inside farther than a radially inside surface of the core back at an axially upper side of the core back and a side wall portion extending to an axially lower side from a lower surface of the upper lid portion. At least a portion of the side wall portion is disposed within the space between the adjacent core back protrusions.

16 Claims, 12 Drawing Sheets

MOTOR

CROSS REFERENCE TO RELATED APPLICATIONS

This application claims the benefit of priority to Japanese Patent Application No. 2018-035535 filed on Feb. 28, 2018. The entire contents of this application are hereby incorporated herein by reference.

BACKGROUND OF THE INVENTION

1. Field of the Invention

The present disclosure relates to a motor.

2. Description of the Related Art

An example of a conventional motor is disclosed in Japanese Registered Utility Model No. 2530781. A stator core in the motor of Japanese Registered Utility Model No. 2530781 is configured by layering stator cores of different shapes other than tooth-shaped portions. By layering the stator cores of the different shapes, space portions arranged in a circumferential direction are formed.

In a case of the motor of Japanese Registered Utility Model No. 2530781, there is a method of fitting a support portion and the stator core together by provision of a gap between an outer circumferential surface of the support portion and an inner circumferential surface of the stator core, and fixing the stator core to the support portion by an adhesive disposed in the gap. That is, the stator core is fixed to an outer circumferential side of the support portion by a clearance fit and adhesion. Specifically, the inner circumferential surface of a portion of the stator core which is located to be sandwiched between the space portions adjacent in the circumferential direction is fixed to the support portion.

At that time, considering workability of an assembly process, it is conceivable to fix the stator core to the support portion after applying the adhesive to the outer circumferential surface of the support portion. Since the stator core has the space portions, the stator core and the support portion are not brought into contact with each other at each of the space portions. Since the adhesive disposed in each of the above non-contacting portions remains high in fluidity while not being cured, the adhesive may leak into an inside of the support portion. For example, in a case of using an anaerobic thermosetting adhesive, when the stator core is fitted to the support portion, the adhesive between the stator core and the support portion is cured by blocking air at a fixing portion between the stator core and the support portion. However, the adhesive at each of the non-contacting portions remains as it is until it is heat cured.

SUMMARY OF THE INVENTION

A motor according to an example embodiment of the present disclosure includes a rotor including a shaft that extends along a central axis extending vertically and being rotatable around the central axis, a bearing housing accommodating a bearing that supports the shaft inside and having a cylindrical shape, and a stator radially opposed to the rotor and fixed to an outer peripheral surface of the bearing housing. The stator includes a core back having an annular shape, a plurality of teeth extending radially outside from the core back and arranged in a circumferential direction, an insulator covering at least a portion of the teeth, and a coil defined by a conductive wire wound around each of the teeth via the insulator. A radially inside surface of the core back includes a plurality of core back protrusions extending radially inside and provided with a space between each other in the circumferential direction, and the insulator includes an upper lid portion extending radially inside farther than a radially inside surface of the core back at an axially upper side of the core back, the upper lid portion having an annular shape, and a side wall portion extending to an axially lower side from a lower surface of the upper lid portion. At least a portion of the side wall portion is disposed within the space between adjacent ones of the core back protrusions.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

An exemplary embodiment of the present disclosure will be described hereinafter with reference to the drawings. In the specification, a direction in which a central axis C1, to be described later, extends is referred to as an "axial direction". Also, one side of the "axial direction" is defined as an upper side, and the other side is defined as a lower side. However, the "vertical direction" in this case is not a vertical direction when a motor is installed in actual equipment. A radial direction around the central axis C1 is simply referred to as the "radial direction" and a circumferential direction around the central axis C1 is simply referred to as the "circumferential direction".

Figure 1:
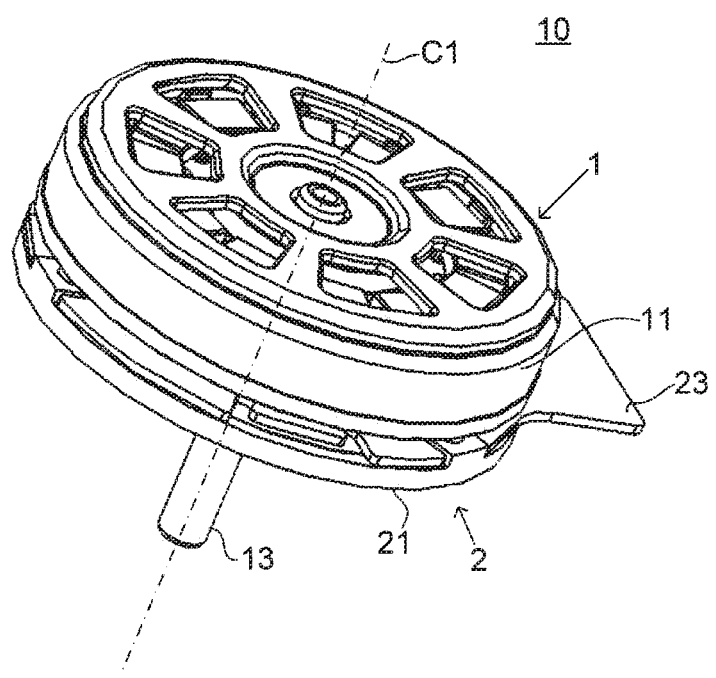
FIG. 1 is an overall perspective view of a motor according to an example embodiment of the present disclosure.
Figure 2:
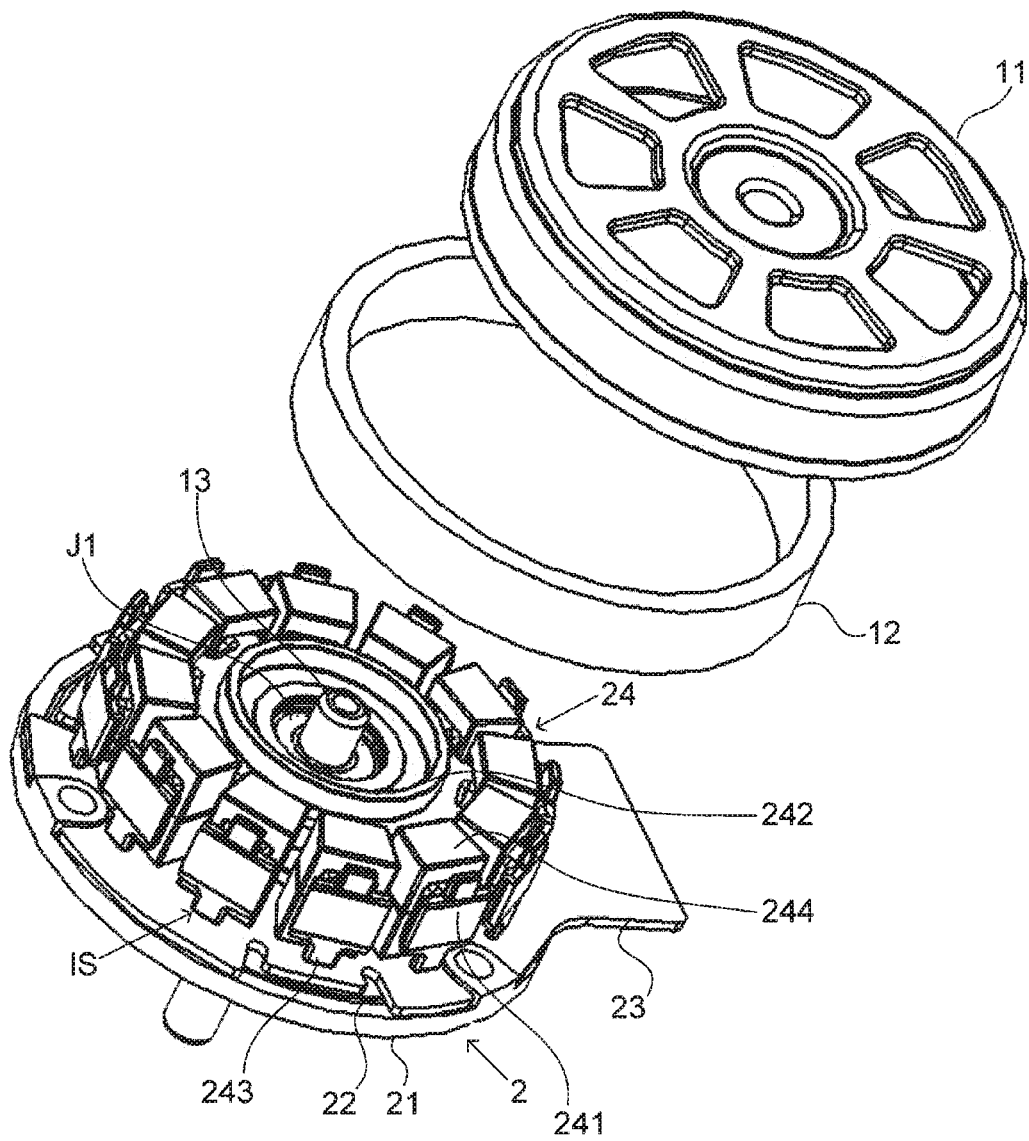
FIG. 2 is a partially exploded perspective view illustrating a state in which a rotor case and a rotor magnet are disassembled in the motor.
Figure 3:
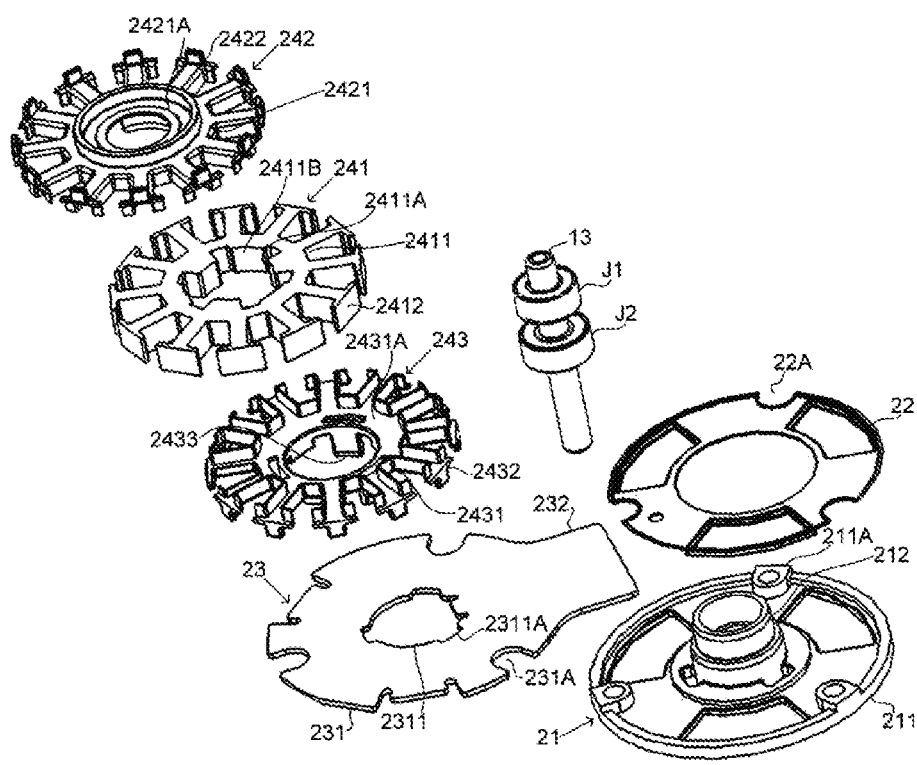
FIG. 3 is an exploded perspective view illustrating a state in which a partial configuration of the motor is disassembled.

An overall configuration of a motor according to the exemplary embodiment of the present disclosure will be described with reference to FIGS. 1 to 3. FIG. 1 is an overall perspective view of a motor 10 according to the exemplary embodiment of the present disclosure. FIG. 2 is a partially exploded perspective view illustrating a state in which a rotor case 11 and a rotor magnet 12 are disassembled in the motor 10. FIG. 3 is an exploded perspective view illustrating a state in which a partial configuration of the motor 10 is disassembled.

The motor 10 is a so-called outer rotor type motor. The motor 10 has a rotor 1 and a stationary part 2. The rotor 1 rotates around the central axis C1 with respect to the stationary part 2.

The rotor 1 has the rotor case 11, the rotor magnet 12, and a shaft 13. The rotor case 11 has a closed-lid cylindrical shape and is open on a lower side. The rotor magnet 12 has an annular shape and is fixed to an inner wall surface of the rotor case 11. The shaft 13 is a rod-like member extending along the central axis C1. An upper end portion of the shaft 13 is fixed to a center of a lid portion of the rotor case 11.

The stationary part 2 has a housing part 21, a spacer 22, a substrate 23, and a stator 24. The housing part 21 has a base part 211 and a bearing housing 212. The base part 211 has a disk shape that expands in a radial direction around the central axis C1. The bearing housing 212 has a cylindrical shape extending in an axial direction around the central axis C1. A lower end portion of the bearing housing 212 is fixed to a center of the base part 211. For example, insert molding, press fitting, caulking, or the like is used as a fixing method of the bearing housing 212. As a result, the bearing housing 212 protrudes upward from the base part 211.

The bearing housing 212 accommodates bearings J1, J2 inside. The bearings J1, J2 are constituted by ball bearings. Alternatively, the bearings J1, J2 may be constituted by, for example, sleeve bearings. The bearing J1 is disposed above the bearing J2. The shaft 13 is rotatably supported by the bearings J1, J2 around the central axis C1.

The spacer 22 is a plate-like member having an annular shape. The spacer 22 has, at its radially outside edge, three cutout portions 22A recessed radially inside. The cutout portions 22A are disposed at equal intervals in a circumferential direction. The spacer 22 is disposed on the base part 211. The cutout portions 22A are fitted to three positioning portions 211A formed on a radially outside edge portion of the base part 211, respectively. Thereby, the spacer 22 is positioned in the circumferential direction with respect to the base part 211.

The substrate 23 has a disk-shaped disk part 231 and a projecting portion 232 that protrudes radially outside from a part of the disk part 231. The substrate 23 is constituted by a rigid substrate. Alternatively, the substrate 23 may be constituted by a flexible printed circuit board (FPC) or the like. The substrate 23 is disposed on the base part 211. The substrate 23 is fixed to the stator 24 as described later. The disk part 231 has, at its radially outside edge, three cutout portions 231A recessed radially inside. The cutout portions 231A are arranged at equal intervals in the circumferential direction and are fitted to the positioning portions 211A. Thereby, the substrate 23 is positioned in the circumferential direction with respect to the base part 211.

The stator 24 includes a stator core 241, an insulator IS, and coils 244. The stator core 241 is constituted by layering thin electromagnetic steel plates in the axial direction. The stator core 241 includes a core back 2411 and a plurality of teeth 2412. The core back 2411 has an annular shape with the central axis C1 as its center. The teeth 2412 protrude radially outside from a radially outside surface of the core back 2411 and are arranged in the circumferential direction. That is, the teeth 2412 are formed radially from the core back 2411.

The insulator IS has an upper insulator 242 and a lower insulator 243. The stator core 241 is sandwiched in a vertical direction by the upper insulator 242 and the lower insulator 243.

The upper insulator 242 is made of insulating material such as resin. The upper insulator 242 has an upper base part 2421 and a plurality of upper cover parts 2422. The upper base part 2421 has a closed-lid cylindrical shape including an upper lid part 2421A and a lower side of the upper base part 2421 is open. The upper cover parts 2422 protrude radially outside from a radially outside surface of the upper base part 2421 and are arranged in the circumferential direction. That is, the upper cover parts 2422 are formed radially from the upper base part 2421. The upper base part 2421 covers an upper end surface of the core back 2411 from an upper side and covers a partial upper side of the radially outside surface of the core back 2411 from a radial outside. Each of the upper cover parts 2422 covers a partial surface including an upper end surface of each of the teeth 2412.

The lower insulator 243 is made of insulating material such as resin. The lower insulator 243 has a lower base part 2431 and lower cover parts 2432. The lower base part 2431 has a closed-lid cylindrical shape including a lower lid part 2431A and an upper side of the lower base part 2431 is open. The lower cover parts 2432 protrude radially outside from a radially outside surface of the lower base part 2431 and are arranged in the circumferential direction. That is, the lower cover parts 2432 are formed radially from the lower base part 2431. The lower base part 2431 covers a lower end surface of the core back 2411 from the lower side and covers a partial lower side of the radially outside surface of the core back 2411 from the radial outside. Each of the lower cover parts 2432 covers a partial surface including a lower end surface of each of the teeth 2412.

A conductive wire is wound around the upper insulator 242 and the lower insulator 243 that sandwich the teeth 2412 in the vertical direction to form coils 244. Each of the coils 244 is insulated from the stator core 241 by the insulator IS.

Incidentally, the lower insulator 243 has snap fit parts 2433 disposed at the lower side relative to the lower base part 2431. The substrate 23 is fixed to the lower insulator 243 by the snap fit parts 2433.

More detailed configurations of the stator core 241 and the insulator IS will be described later.

By fixing the stator core 241 to an outer peripheral surface of the bearing housing 212, the stator 24 is fixed to the bearing housing 212. A fixing method of the stator core 241 to the bearing housing 212 will be described later. The rotor magnet 12 is radially opposed to the teeth 2412 at the radial outside of the teeth 2412.

In the motor 10 configured as described above, a current is supplied to each of the coils 244 from the substrate 23, so that a magnetic field is generated in the coils 244. Due to an interaction between the generated magnetic field and the rotor magnet 12, circumferential torque is generated in the rotor 1. Thus, the rotor 1 rotates around the central axis C1.

Figure 4:
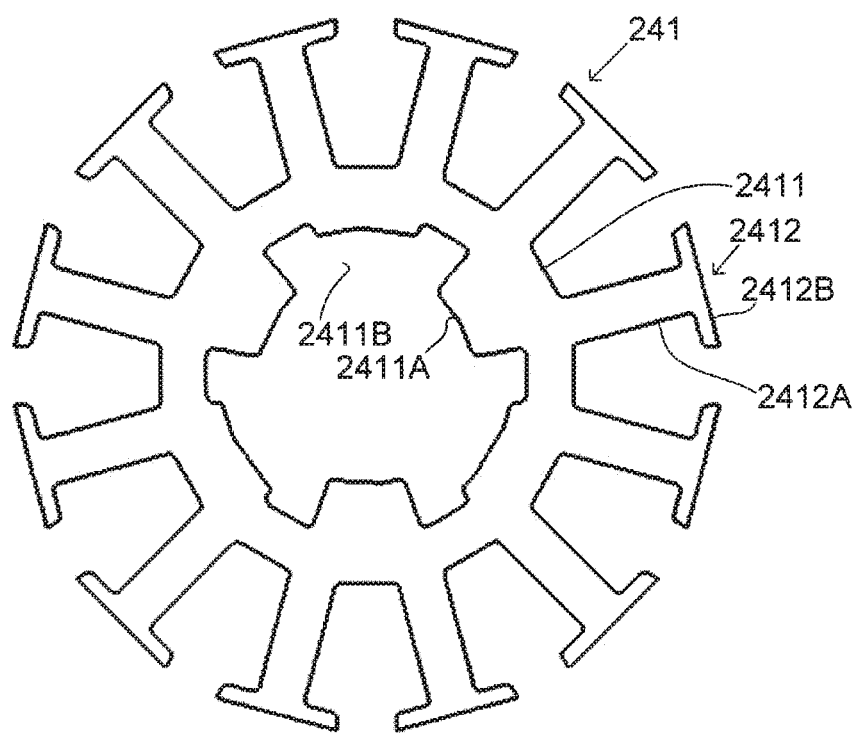
FIG. 4 is a plan view of a stator core as viewed from an axially upper side.

A more detailed configuration of the stator core 241 will be described hereinafter with reference to FIG. 4 in addition to FIG. 3. FIG. 4 is a plan view of the stator core 241 as viewed from an axially upper side. As described above, the stator core 241 has the core back 2411 and the plurality of teeth 2412.

A radially inside surface of the core back 2411 has a plurality of core back protrusions 2411A. The core back protrusions 2411A extend radially inside and are arranged to have a space therebetween in the circumferential direction. In an example of FIG. 4, three core back protrusions 2411A are formed at equal intervals in the circumferential direction. Thereby, a core back recess 2411B is formed between the core back protrusions 2411A adjacent each other in the circumferential direction. That is, the core back recess 2411B is disposed in the above space. In this manner, the stator core 241 is intended to reduce its weight by having lightened shapes.

Each of the teeth 2412 has a linear part 2412A extending in the radial direction and an enlarged part 2412B circumferentially expanding at a radially outside end portion of the linear part 2412A. That is, each of the teeth 2412 has a T shape as viewed in the axial direction.

Figure 5:
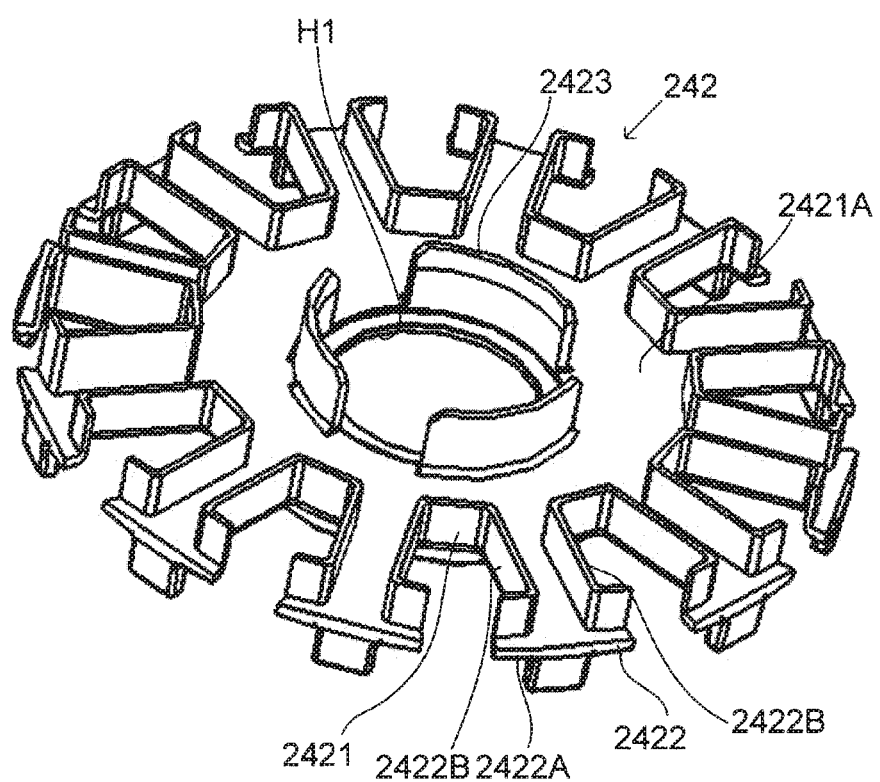
FIG. 5 is a perspective view of an upper insulator as viewed from a lower side.

A more detailed configuration of the upper insulator 242 will be described hereinafter with reference to FIG. 5 in addition to FIG. 3. FIG. 5 is a perspective view of the upper insulator 242 as viewed from the lower side. The upper insulator 242 is a part of the insulator IS.

As described above, the upper insulator 242 has the upper base part 2421 having the closed-lid cylindrical shape and the plurality of upper cover parts 2422. The upper base part 2421 has the upper lid part 2421A. The upper lid part 2421A has an annular shape with a hole H1 in a center. That is, the hole H1 forms a radially inside edge of the upper lid part 2421A. The upper lid part 2421A covers an entire upper end surface of the core back 2411 from the upper side.

A plurality of side wall parts 2423 protruding downward are formed at intermediate positions in the radial direction of the upper lid part 2421A. That is, the upper insulator 242 has the side wall parts 2423 each extending to the lower side from a lower surface of the upper lid part 2421A. Three side wall parts 2423 extend in the circumferential direction and are arranged at equal intervals in the circumferential direction in an example of FIG. 5. Each of the side wall parts 2423 is disposed in the core back recess 2411B. Operation of each of the side wall parts 2423 will be described later.

Each of the upper cover parts 2422 includes an upper cover 2422A and a pair of upper side wall covers 2422B. Each of the upper covers 2422A is formed to project radially outside from the upper lid part 2421A and has a T shape as viewed in the axial direction. The pair of upper side wall covers 2422B are formed to extend downward from edge portions of the upper cover 2422A respectively and are opposed to each other in the circumferential direction. The upper end surface of each of the teeth 2412 is covered from the upper side by the upper cover 2422A. Parts of upper sides of circumferentially side surfaces of each of the linear parts 2412A are covered from both sides in the circumferential direction and a part of an upper side of a radially inside surface of each of the enlarged parts 2412B is covered from the radial inside by the upper side wall covers 2422B.

Figure 6:
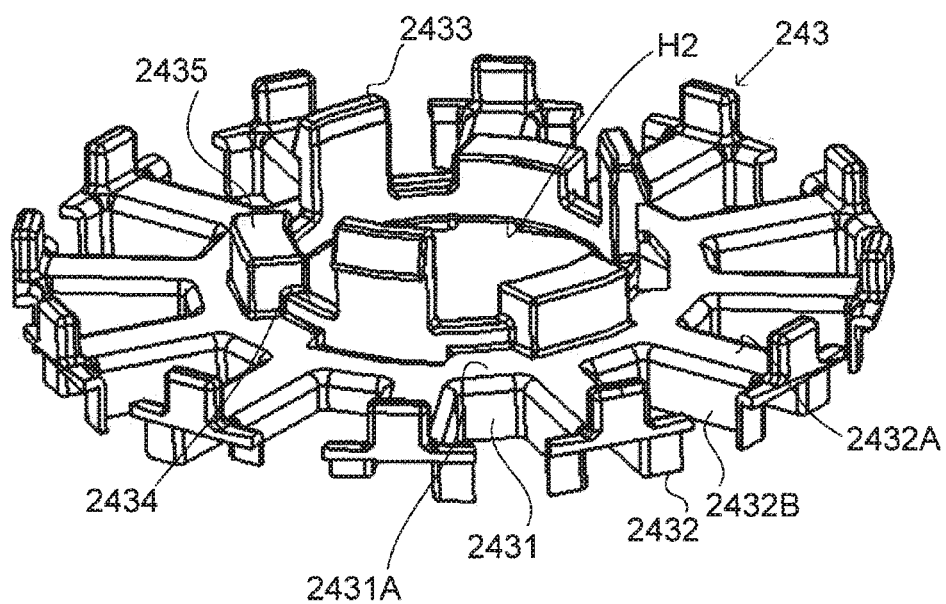
FIG. 6 is a perspective view of a lower insulator as viewed from the lower side.

A more detailed configuration of the lower insulator 243 will be described hereinafter with reference to FIG. 6 in addition to FIG. 3. FIG. 6 is a perspective view of the lower insulator 243 as viewed from the lower side. The lower insulator 243 is a part of the insulator IS.

As described above, the lower insulator 243 has the lower base part 2431 having the closed-lid cylindrical shape and a plurality of the lower cover parts 2432. The lower base part 2431 has the lower lid part 2431A. The lower lid part 2431A has an annular shape with a hole H2 in a center. The lower lid part 2431A covers the entire lower end surface of the core back 2411 from the lower side.

Each of the lower cover parts 2432 includes a lower cover 2432A and a pair of lower side wall covers 2432B. Each of the lower covers 2432A is formed to project radially outside from the lower lid part 2431A and has a T shape as viewed in the axial direction. The pair of lower side wall covers 2432B are formed to extend upward from edge portions of the lower cover 2432A, respectively and are opposed to each other in the circumferential direction. The lower end surface of each of the teeth 2412 is covered from the lower side by the lower cover 2432A. Parts of lower sides of the circumferentially side surfaces of each of the linear parts 2412A are covered from the both sides in the circumferential direction and a part of a lower side of the radially inside surface of each of the enlarged parts 2412B is covered from the radial inside by the lower side wall covers 2432B.

In addition, an annular wall part 2434 projects annularly downward from the radial inside of the lower lid part 2431A. Further, a plurality of the snap fit parts 2433 protrude downward from a part of the annular wall part 2434 in the circumferential direction. Three snap fit parts 2433 are arranged at equal intervals in the circumferential direction. A plurality of positioning parts 2435 protrude downward and radially outside from a part of the annular wall part 2434 in the circumferential direction. Each of the positioning parts 2435 is disposed between the snap fit parts 2433 circumferentially adjacent each other, and three positioning parts 2435 are arranged at equal intervals in the circumferential direction. That is, the lower insulator 243 has the annular wall part 2434, the snap fit parts 2433, and the positioning parts 2435.

As shown in FIG. 3, in the substrate 23, a hole 2311 is formed in a center of the disk part 231. A plurality of cutout portions 2311A recessed radially outside are formed in the hole 2311. When the cutout portions 2311A are brought into contact with the snap fit parts 2433 respectively and the substrate 23 is pushed to a side of the lower insulator 243 from downward, each of the snap fit parts 2433 elastically deforms radially inside. Thus, the substrate 23 is pushed into a position in which the substrate 23 is sandwiched between the snap fit parts 2433 and the positioning parts 2435 in the vertical direction. Thereby, the substrate 23 is positioned in the axial direction. Further, the substrate 23 is positioned in the circumferential direction by fitting the cutout portions 2311A and the snap fit parts 2433. As described above, the substrate 23 is fixed to the lower insulator 243.

Figure 7:
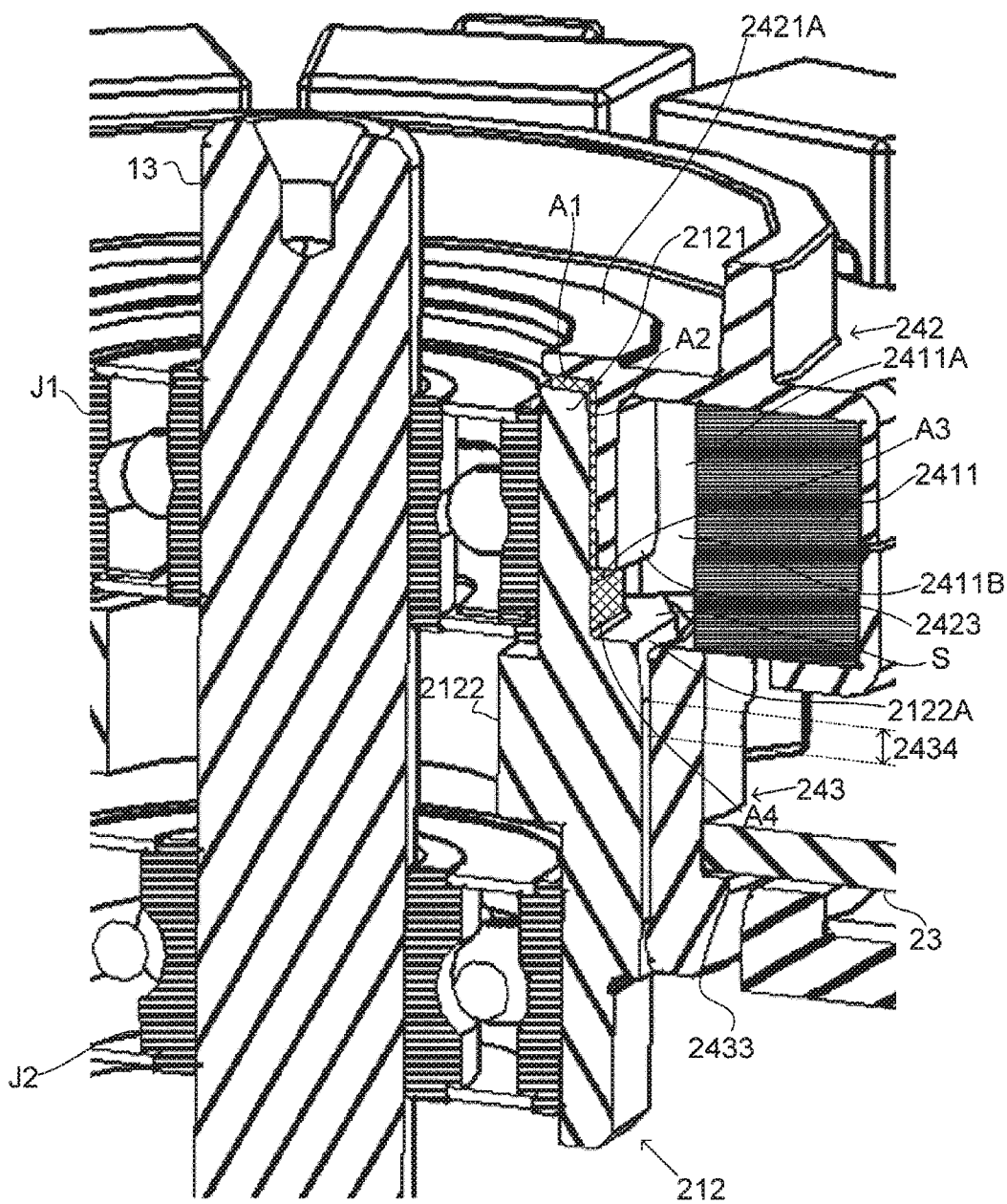
FIG. 7 is an axially sectional perspective view of a partial configuration of the motor.

A fixation of the stator 24 to the bearing housing 212 will be described with reference to also FIG. 7 hereinafter. FIG. 7 is an axially sectional perspective view of a partial configuration of the motor 10 and illustrates an essential part in an enlarged manner. In FIG. 7, adhesives A1 to A4 are shown.

More specifically, the bearing housing 212 has an upper cylindrical portion 2121 and a lower cylindrical portion 2122. The upper cylindrical portion 2121 is connected to an upper side of the lower cylindrical portion 2122. The bearing J1 is held inside the upper cylindrical portion 2121 and the bearing J2 is held inside the lower cylindrical portion 2122. A step S is formed on the radial outside of a portion where the upper cylindrical portion 2121 and the lower cylindrical portion 2122 are connected.

The stator core 241 is fixed to the bearing housing 212 by fitting through a gap between each of the core back protrusions 2411A of the core back 2411 and the radially outside surface of the upper cylindrical portion 2121 and adhesion with the adhesive at its fitting portion. That is, the stator core 241 is fixed to the bearing housing 212 by a clearance fit and the adhesion. Such a fixing method is particularly effective when the bearing housing 212 is made of nonferrous metal such as aluminum or zinc. When material is the nonferrous metal, it is difficult to set the fitting because strength of the bearing housing is low, so that the bearing housing is easy to deform, and a coefficient of linear expansion is larger than that of iron. Thus, as compared with the use of an interference fit as the fixing method, the above method is effective. However, in the present disclosure, the material of the bearing housing is not limited to the nonferrous metal.

In the fixing method described above, after the adhesive is applied to the radially outside surface of the upper cylindrical portion 2121 in consideration of workability in an assembly process, the stator core 241 is fitted and fixed to the upper cylindrical portion 2121. The adhesive A4 shown in FIG. 7 is the adhesive applied to the radially outside surface of the upper cylindrical portion 2121. At this time, the stator core 241 of a component in a state in which the insulator IS is assembled to the stator core 241 in advance, the coils 244 are formed, and the substrate 23 is fixed to the lower insulator 243 is inserted from an upper side of the bearing housing 212 to the upper cylindrical portion 2121.

As a result, the adhesive is filled in the gap between each core back protrusion 2411A and the radially outside surface of the upper cylindrical portion 2121. When the adhesive is, for example, anaerobic, the adhesive filled in the gap is cured by blocking air. At this time, a space is formed between the core back 2411 and the radially outside surface of the upper cylindrical portion 2121 at a place of each of the core back recesses 2411B. In the space, in addition to the adhesive applied in the space, the adhesive overflowing from a fixing portion of each of the core back protrusions 2411A is placed. That is, the unnecessary adhesive for fixing is storable in the space. In a case where the adhesive is, for example, a thermosetting type adhesive, the adhesive placed in the space is maintained in a high fluidity state unless a heat treatment step is performed.

However, since the upper lid part 2421A extends radially inside, a radially inside end of the upper lid part 2421A is positioned at an entire circumference between a radially inside end and a radially outside end of an upper end surface of the upper cylindrical portion 2121. That is, the upper lid part 2421A covers the upper end surface of the upper cylindrical portion 2121 from the upper side. Thus, the adhesive disposed in the above space of the place of each of the core back recesses 2411B is suppressed from leaking into an inside of the bearing housing 212. As a result, a movement of the adhesive to a side of the bearing J1 is suppressed. The adhesive A1 shown in FIG. 7 is the adhesive in which after the adhesive disposed in the above space has moved upward through a clearance between a radially inside surface of each of the side wall parts 2423 and the radially outside surface of the upper cylindrical portion 2121, the adhesive is prevented from moving to the side of the bearing J1 by the upper lid part 2421A.

Thereby, leakage of the adhesive is suppressed even though the fluidity is high in a state before the heat treatment step and during the heat treatment step. In addition, since the leakage of the adhesive is suppressed, the heat treatment step itself may be omitted. In this case, the adhesive is cured by heat generated by driving of the motor 10. Further, this is not limited to the thermosetting type adhesive, and the same also applies to a case of using, for example, a UV curing adhesive. Furthermore, as the adhesive, not only the anaerobic one but also, for example, an instant adhesive may be used.

The radially inside end of the upper lid part 2421A may be configured to be positioned radially inside relative to the radially inside surface of the core back 2411 and radially outside relative to the radially outside end of the upper end surface of the bearing housing 212. Even in this case, the effect of suppressing the leakage of the adhesive is obtainable.

As described above, the upper insulator 242 has the side wall parts 2423. Each of the side wall parts 2423 is disposed in the core back recess 2411B. When the core back protrusion 2411A is fitted to the upper cylindrical portion 2121 from the upper side, the side wall parts 2423 come into contact with the radially outside surface of the upper cylindrical portion 2121 and push the adhesive applied to the radially outside surface of the upper cylindrical portion 2121 to the lower side. The adhesive A2 shown in FIG. 7 illustrates the adhesive remaining in the clearance between the side wall part 2423 and the upper cylindrical portion 2121. Further, the adhesive A3 illustrates the adhesive pushed into the lower side by the side wall part 2423. Since the adhesive is kept away from the upper end surface of the bearing housing 212 by the side wall parts 2423, the leakage of the adhesive into the inside of the bearing housing 212 is suppressed. Incidentally, each of the side wall parts 2423 may be disposed at a position where a radially inside surface of the side wall part 2423 is not brought into contact with the upper cylindrical portion 2121.

In other words, the motor 10 includes the rotor 1 including the shaft 13 that extends along the central axis C1 extending vertically and being rotatable around the central axis C1, the bearing housing 212 accommodating the bearings J1, J2 that support the shaft 13 inside and having a cylindrical shape, and the stator 24 radially opposed to the rotor 1 and fixed to the outer peripheral surface of the bearing housing 212.

The stator 24 includes the core back 2411 having an annular shape, the plurality of teeth 2412 extending radially outside from the core back 2411 and arranged in the circumferential direction, the insulator IS covering at least a part of the teeth 2412, and the coils 244 each of which is formed by winding the conductive wire around each of the teeth 2412 via the insulator IS.

The radially inside surface of the core back 2411 has the plurality of core back protrusions 2411A extending radially inside and arranged to have the space between each other in the circumferential direction. The insulator IS has the annular upper lid part 2421A extending more radially inside than the radially inside surface of the core back 2411 at the axially upper side of the core back 2411 and the side wall parts 2423 each extending to an axially lower side from the lower surface of the upper lid part 2421A. At least a part of each side wall part 2423 is disposed within the space (core back recess 2411B) between the adjacent core back protrusions 2411A.

As a result, the excess adhesive is gathered and stored in each of the space between the core back protrusions. The stored adhesive is suppressed from leaking into the inside of the bearing housing by the upper lid part. Further, since the adhesive is kept away from an axially upper side end surface of the bearing housing by the side wall parts, the leakage of the adhesive is further suppressed.

At least a part of a circumferentially side surface of each of the side wall parts 2423 is brought into contact with a circumferentially side surface of the core back protrusion 2411A.

Thereby, the adhesive protruding on the circumferentially side surface of each of the core back protrusions and the adhesive applied in the vicinity are moved away from the axially upper side end surface of the bearing housing by each of the side wall parts 2423, so that the leakage of the adhesive into the inside of the bearing housing is further suppressed.

In addition, a radial position of the radially inside surface of each of the side wall parts 2423 is the same as a radial position of the radially inside surface of each of the core back protrusions 2411A or the radial outside relative to the radial position of the radially inside surface of each of the core back protrusions 2411A.

Thereby, the fitting between the stator core and the bearing housing is not hindered by the side wall parts.

At least a part of the radially inside surface of each of the side wall parts 2423 is brought into contact with the radially outside surface of the upper cylindrical portion 2121. That is, at least a part of the radially inside surface of each of the side wall parts 2423 is brought into contact with the radially outside surface of the bearing housing 212.

As a result, the unused adhesive applied to the radially outside surface of the bearing housing is pushed to the axially lower side by the side wall parts, and the adhesive is moved away from the axially upper side end surface of the bearing housing, so that the leakage of the adhesive into the inside of the bearing housing is suppressed. In addition, a contact portion between a radially inside wall surface of each of the side wall parts and the radially outside surface of the bearing housing prevents the adhesive from moving to the axially upper side end surface of the bearing housing.

An axially lower side end surface of each of the side wall parts 2423 is positioned at the axially upper side relative to an axially lower side end surface of the core back 2411. Thereby, the lower surface of the core back 2411 is brought into contact with the step S before the lower end surface of each of the side wall parts 2423 comes into contact with the step S serving as a positioning surface. That is, the stator core is axially positioned by the positioning surface provided in the bearing housing.

As described above, the upper lid part 2421A covers at least a part of the axially upper end surface of the bearing housing 212. Thus, since the upper lid part of the insulator covers one axially side end surface of the bearing housing, the leakage of the adhesive into the inside of the bearing housing is suppressed.

The annular wall part 2434 (FIGS. 6 and 7) of the lower insulator 243 is brought into contact with the radially outside surface of the lower cylindrical portion 2122 of the bearing housing 212 in the entire circumferential direction. The adhesive protruding from the fitting portion of each of the core back protrusions 2411A and the adhesive pushed to the lower side by each of the side wall parts 2423 are stored in a lower side of the space of each of the core back recesses 2411B. However, due to the contacting configuration of the annular wall part 2434 described above, the leakage of the stored adhesive to the lower side is suppressed.

That is, the insulator IS includes the upper insulator 242 covering at least a part of an axially upper side of the teeth 2412 and the lower insulator 243 covering at least a part of an axially lower side of the teeth 2412, and at least a part in the axial direction of a radially inside surface of the lower insulator 243 is brought into contact with the radially outside surface of the bearing housing 212 in the entire circumferential direction. As a result, the excess adhesive stored during assembly is suppressed from leaking into the axially lower side.

A tapered surface 2122A that is inclined radially outside as going to the lower side is formed at an upper end of the radially outside surface of the lower cylindrical portion 2122. A gap is formed between the tapered surface 2122A and the radially inside surface of the lower insulator 243, and the gap is located at an upper side relative to a contact portion between the annular wall part 2434 and the lower cylindrical portion 2122.

That is, the radial gap is provided between the radially inside surface of the lower insulator 243 and the radially outside surface of the bearing housing 212 at the axially upper side relative to the contact portion between the radially inside surface of the lower insulator 243 and the radially outside surface of the bearing housing 212.

Therefore, the lower insulator becomes easy to be fitted to the bearing housing. In addition, the above radial gap serves as a gathering space for the adhesive.

Further, the snap fit parts 2433 are disposed at the lower side relative to the contact portion between the annular wall part 2434 and the lower cylindrical portion 2122. That is, the lower insulator 243 further includes the snap fit parts 2433 that extend to the axially lower side and hold the substrate 23, and the contact portion between the radially inside surface of the lower insulator 243 and the radially outside surface of the bearing housing 212 is located at the axially upper side relative to the snap fit parts 2433.

Thereby, the adhesive is suppressed from reaching each of the snap fit parts fixing the substrate.

Further, the snap fit parts 2433 and the fitting portion between the radially inside surface of each of the core back protrusions 2411A and the radially outside surface of the bearing housing 212 are not superimposed in the circumferential direction. Thus, when the stator core is assembled, even when the adhesive applied to the bearing housing sticks to the snap fit parts and an amount of the adhesive on the bearing housing side decreases, there is no influence on the amount of the adhesive in the fitting portion between the stator core and the bearing housing.

Figure 8:
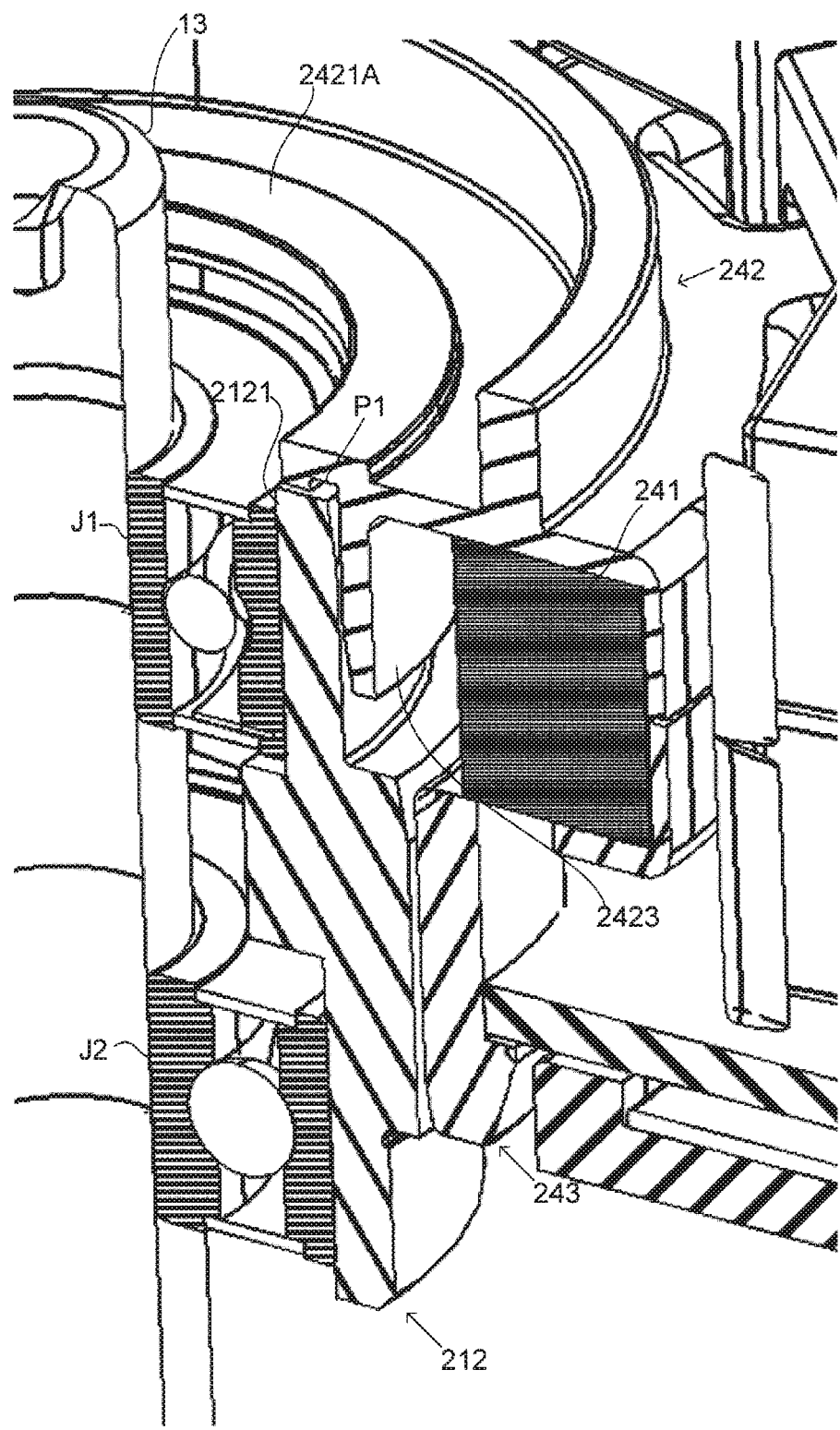
FIG. 8 is an axially sectional perspective view of a partial configuration of a motor according to a first modification of an example embodiment of the present disclosure.

FIG. 8 is an axially sectional perspective view of a partial configuration of a motor according to a first modification, corresponding to FIG. 7. In a configuration shown in FIG. 8, a radially inside end part of the upper lid part 2421A has a recess cross section in the axial direction. Thus, on the lower surface of the upper lid part 2421A opposed to the upper end surface of the upper cylindrical portion 2121, an insulator recess P1 recessed to the upper side is formed. That is, the insulator recess P1 recessed to the axially upper side is formed on the lower surface of the upper lid part 2421A axially opposed to the axially upper end surface of the bearing housing 212. As a result, since the insulator recess serves as the gathering space for the adhesive, the adhesive is suppressed from moving into the inside of the bearing housing.

Figure 9:
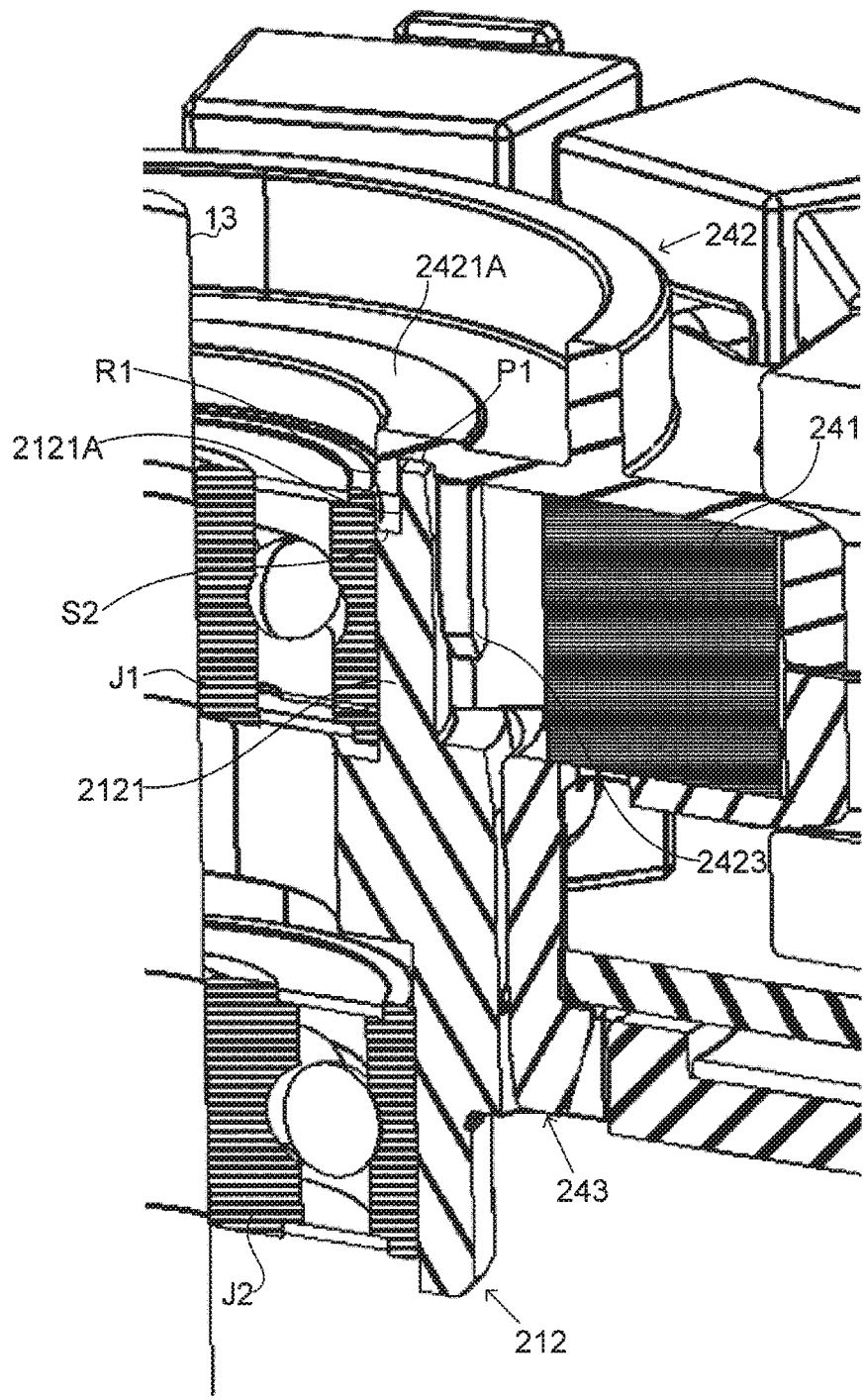
FIG. 9 is an axially sectional perspective view of a partial configuration of a motor according to a second modification of an example embodiment of the present disclosure.

FIG. 9 is an axially sectional perspective view of a partial configuration of a motor according to a second modification, corresponding to FIG. 7. In a configuration shown in FIG. 9, the radially inside end part of the upper lid part 2421A has a lower cylindrical part R1 that extends to the axially lower side. On the other hand, at an upper portion of the upper cylindrical portion 2121, a cylindrical wall portion 2121A protrudes upward from the radial outside of a step S2. A radially outside surface of the lower cylindrical part R1 comes into contact with a radially inside surface of the cylindrical wall portion 2121A.

That is, a radially inner end of the upper lid part 2421A has the lower cylindrical part R1 that extends to the axially lower side at the radially inside relative to the side wall parts 2423, and the radially outside surface of the lower cylindrical part R1 is fitted to the radially inside surface of the bearing housing 212. As a result, the leakage of the adhesive into the inside of the bearing housing is further suppressed.

In the configuration shown in FIG. 9, the insulator recess P1 recessed to the upper side is formed on the lower surface of the upper lid part 2421A opposed to the upper end surface of the cylindrical wall portion 2121A. As a result, the insulator recess P1 serves as the gathering space for the adhesive.

Figure 10:
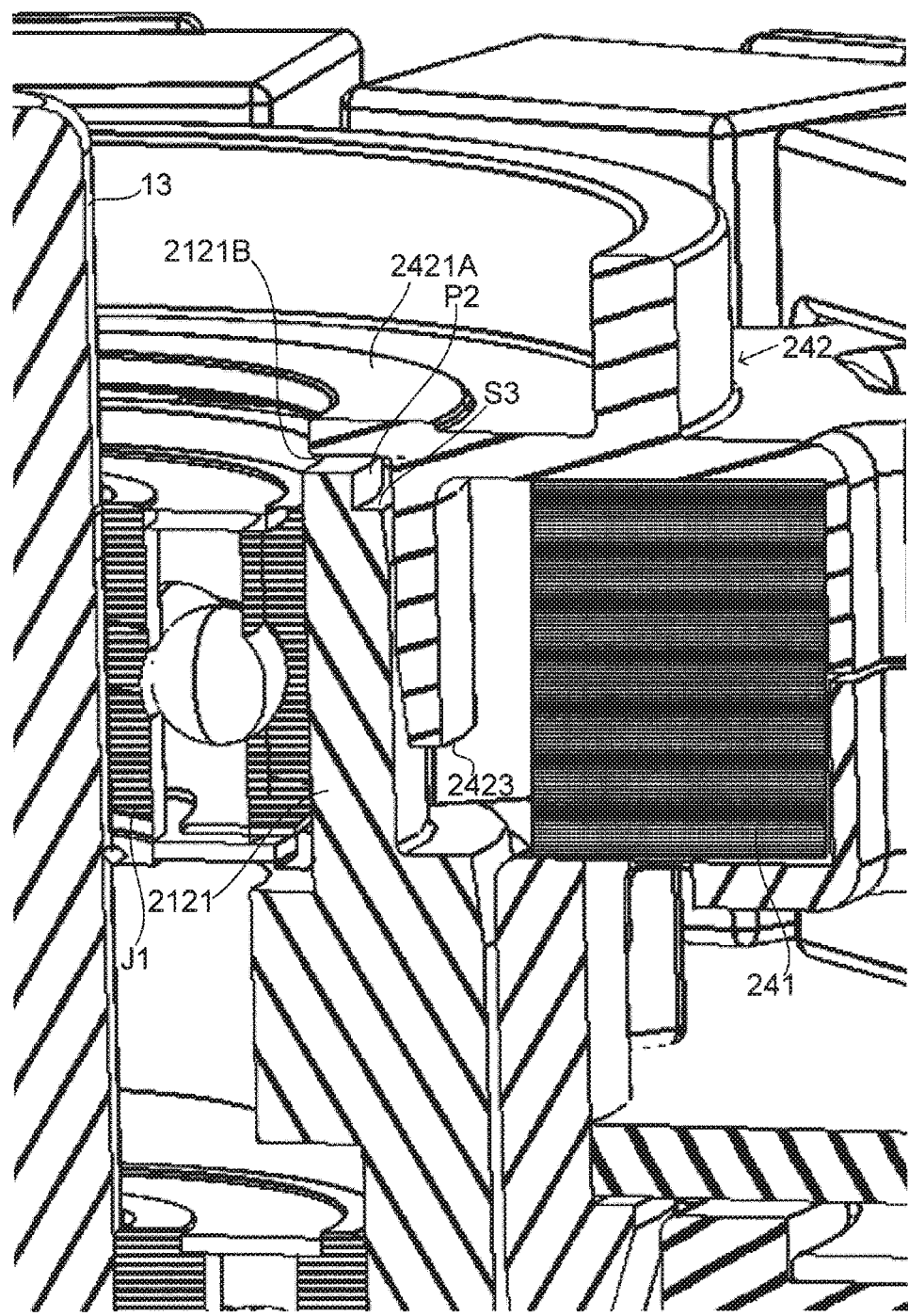
FIG. 10 is an axially sectional perspective view of a partial configuration of a motor according to a third modification of an example embodiment of the present disclosure.

FIG. 10 is an axially sectional perspective view of a partial configuration of a motor according to a third modification, corresponding to FIG. 7. In a configuration shown in FIG. 10, at the upper portion of the upper cylindrical portion 2121, a cylindrical wall portion 2121B protrudes upward from the radial inside of a step S3. A housing recess P2 recessed to the lower side is formed at a position opposed to the upper lid part 2421A by the step S3 and a radially outside surface of the cylindrical wall portion 2121B.

That is, the housing recess P2 recessed to the axially lower side is provided at a radially outside corner of an axially upper end portion of the bearing housing 212 axially opposed to the upper lid part 2421A. Thus, since the housing recess serves as the gathering space for the adhesive, the adhesive is suppressed from moving into the inside of the bearing housing. Incidentally, the housing recess P2 may be formed by a C chamfer plane.

Figure 11:
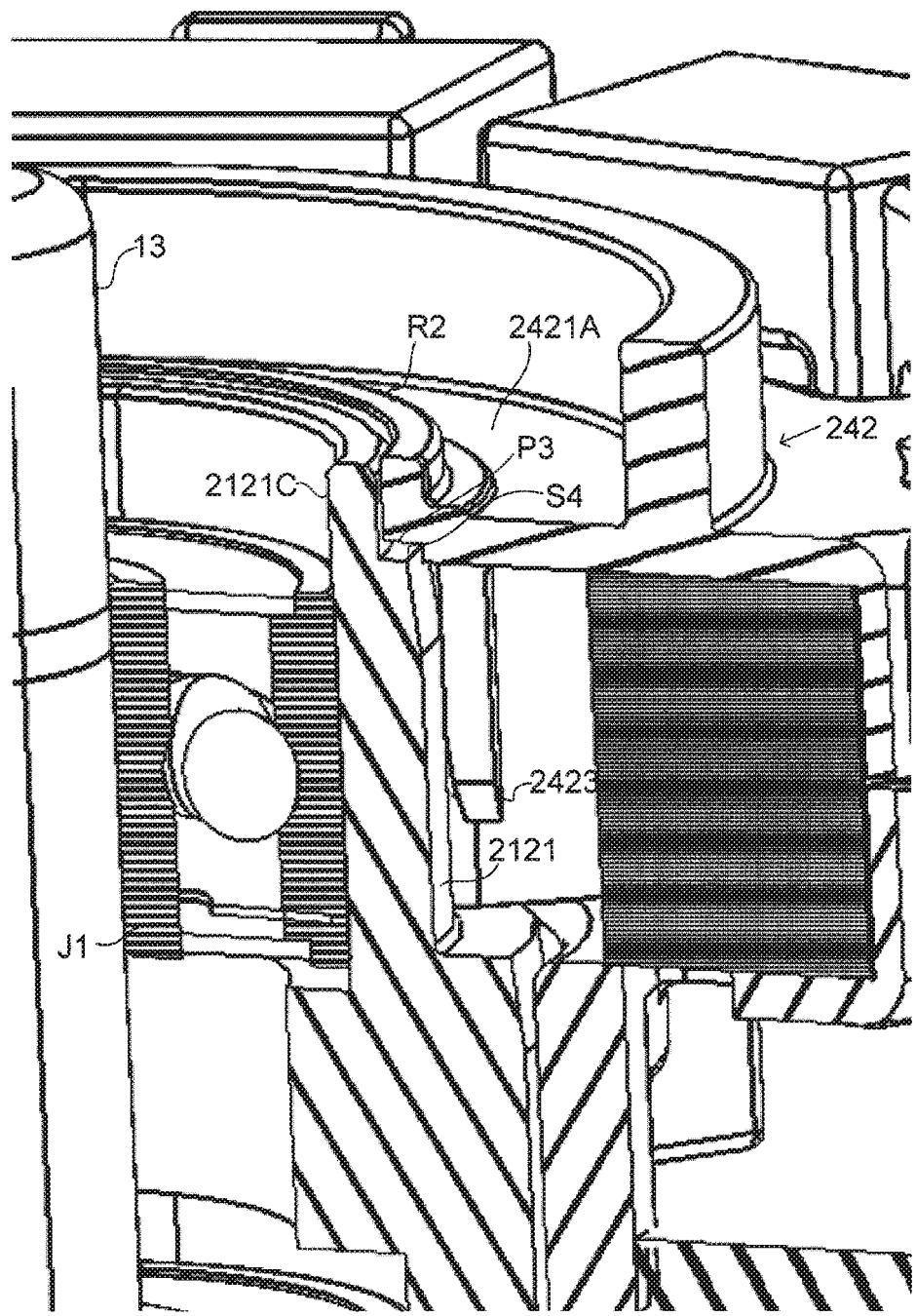
FIG. 11 is an axially sectional perspective view of a partial configuration of a motor according to a fourth modification of an example embodiment of the present disclosure.

FIG. 11 is an axially sectional perspective view of a partial configuration of a motor according to a fourth modification, corresponding to FIG. 7. In a configuration shown in FIG. 11, an upper cylindrical part R2 that extends to the upper side is formed at the radially inner end of the upper lid part 2421A. On the other hand, at the upper portion of the upper cylindrical portion 2121, a cylindrical wall portion 2121C protrudes upward from a radially inside of a step S4. A radially inside surface of the upper cylindrical part R2 comes into contact with a radially outside surface of the cylindrical wall portion 2121C.

That is, the radially inner end of the upper lid part 2421A has the upper cylindrical part R2 extending to the axially upper side, and the radially inside surface of the upper cylindrical part R2 is fitted to the radially outside surface of the bearing housing 212. As a result, the leakage of the adhesive into the inside of the bearing housing is further suppressed.

In the structure shown in FIG. 11, an insulator recess P3 recessed to the upper side is formed on the lower surface of the upper lid part 2421A opposed to the step S4. As a result, the insulator recess P3 becomes the gathering space for the adhesive.

Figure 12:
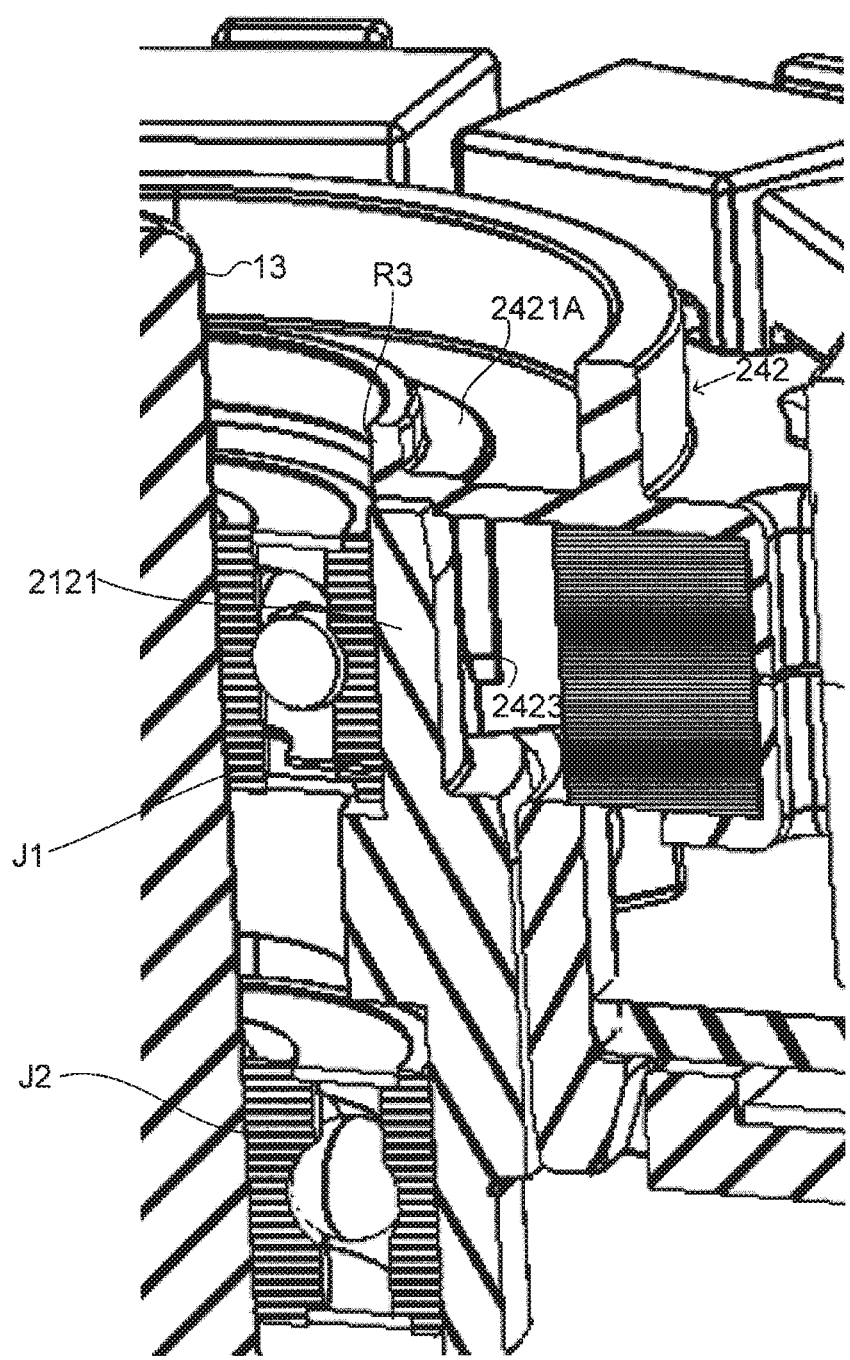
FIG. 12 is an axially sectional perspective view of a partial configuration of a motor according to a fifth modification of an example embodiment of the present disclosure.

FIG. 12 is an axially sectional perspective view of a partial configuration of a motor according to a fifth modification, corresponding to FIG. 7. In a configuration shown in FIG. 12, a protrusion wall part R3 that protrudes to the upper side is formed at the radially inner end of the upper lid part 2421A. The protrusion wall part R3 is cylindrical. In addition, the protrusion wall part R3 may be formed radially outside relative to the radially inner end of the upper lid part 2421A.

That is, the insulator IS has the protrusion wall part R3 protruding to the axially upper side. The side wall parts of the insulator are provided so as to correspond to the recesses of the stator core, and are discontinuous in the circumferential direction. This may cause deformation in the upper lid part. Since the protrusion wall part suppresses an axial deformation of the upper lid part, separation between the upper lid part and one axially side end surface of the bearing housing is suppressed, so that the leakage of the adhesive into the inside of the bearing housing is suppressed.

In the configuration shown in FIG. 7 described above, the position of the radially inner end of the upper lid part 2421A is located above the upper end surface of the upper cylindrical portion 2121. However, as another modification, the position of the radially inner end of the upper lid part 2421A may be extended to the radial inside so that the position is located above the bearing J1.

That is, the upper lid part 2421A may cover at least a part of an upper surface of the bearing J1. As a result, grease of the bearing is suppressed from scattering to an outside of the motor, and invasion of foreign matter from the outside into the bearing is suppressed. In addition, with the above configuration, it is necessary to attach the bearing to the bearing housing prior to the stator core. However, by applying the adhesive after attaching it earlier, the process and time from application to curing of the adhesive are reduced and the adhesive is suppressed from moving.

The present disclosure is applicable to, for example, the outer rotor type motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotor including a shaft that extends along a central axis extending vertically and being rotatable around the central axis;
   a bearing housing accommodating a bearing that supports the shaft inside and having a cylindrical shape; and
   a stator radially opposed to the rotor and fixed to an outer peripheral surface of the bearing housing; wherein
   the stator includes:
     a core back having an annular shape;
     a plurality of teeth extending radially outside from the core back and arranged in a circumferential direction;
     an insulator covering at least a portion of the teeth; and
     a coil defined by a conductive wire wound around each of the teeth via the insulator;
   a radially inside surface of the core back includes a plurality of core back protrusions extending radially inside and provided with a space between each other in the circumferential direction;
   the insulator includes:
     an upper lid portion extending radially inside farther than a radially inside surface of the core back at an axially upper side of the core back, the upper lid portion having an annular shape; and
     a side wall portion extending to an axially lower side from a lower surface of the upper lid portion; and
   at least a portion of the side wall portion is disposed within the space between adjacent ones of the core back protrusions.

2. The motor according to claim 1, wherein at least a portion of a circumferentially side surface of the side wall portion comes into contact with a circumferentially side surface of the core back protrusions.

3. The motor according to claim 1, wherein a radial position of a radially inside surface of the side wall portion is same as a radial position of a radially inside surface of each of the core back protrusions or is farther radially outside than the radial position of the radially inside surface of each of the core back protrusions.

4. The motor according to claim 1, wherein at least a portion of a radially inside surface of the side wall portion is contactable with a radially outside surface of the bearing housing.

5. The motor according to claim 1, wherein an axially lower side end surface of the side wall portion is positioned at the axially upper side relative to an axially lower side end surface of the core back.

6. The motor according to claim 1, wherein the upper lid portion covers at least a portion of an axially upper end surface of the bearing housing.

7. The motor according to claim 6, wherein an insulator recess recessed to the axially upper side is provided on a lower surface of the upper lid portion that is axially opposed to the axially upper end surface of the bearing housing.

8. The motor according to claim 6, wherein a housing recess recessed to the axially lower side is provided at a radially outside corner of an axially upper end portion of the bearing housing axially opposed to the upper lid portion.

9. The motor according to claim 6, wherein a radially inner end of the upper lid portion includes an upper cylindrical portion extending to the axially upper side; and a radially inside surface of the upper cylindrical portion is fitted to a radially outside surface of the bearing housing.

10. The motor according to claim 6, wherein a radially inner end of the upper lid portion includes a lower cylindrical portion that extends to the axially lower side at a radially inside relative to the side wall portion; and a radially outside surface of the lower cylindrical portion is fitted to a radially inside surface of the bearing housing.

11. The motor according to claim 1, wherein the upper lid portion covers at least a portion of an upper surface of the bearing.

12. The motor according to claim 1, wherein the insulator includes a protrusion wall portion protruding to the axially upper side.

13. The motor according to claim 1, wherein the insulator includes an upper insulator covering at least a portion of the axially upper side of the teeth and a lower insulator covering at least a portion of the axially lower side of the teeth; and at least a portion in an axial direction of a radially inside surface of the lower insulator comes into contact with a radially outside surface of the bearing housing in the entire circumferential direction.

14. The motor according to claim 13, wherein a radial gap is provided between the radially inside surface of the lower insulator and the radially outside surface of the bearing housing at the axially upper side relative to a contact portion between the radially inside surface of the lower insulator and the radially outside surface of the bearing housing.

15. The motor according to claim 13, wherein the lower insulator further includes a snap fit portion that extends to the axially lower side and holds a substrate; and a contact portion between the radially inside surface of the lower insulator and the radially outside surface of the bearing housing is positioned at the axially upper side relative to the snap fit portion.

16. The motor according to claim 15, wherein the snap fit portion and a fitting portion between a radially inside surface of each of the core back protrusions and the radially outside surface of the bearing housing are not superimposed in the circumferential direction.

* * * * *